(12) United States Patent
Bastioli et al.

(10) Patent No.: US 8,193,298 B2
(45) Date of Patent: *Jun. 5, 2012

(54) BIODEGRADABLE ALIPHATIC-AROMATIC POLYESTERS

(75) Inventors: Catia Bastioli, Novara (IT); Tiziana Milizia, Novara (IT); Giovanni Floridi, Novara (IT); Andrea Scaffidi Lallaro, Omegna (IT); Giandomenico Cella, Novara (IT); Maurizio Tosin, Serravalle Sesia (IT)

(73) Assignee: Novamont S.p.A., Novara (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/909,012

(22) PCT Filed: Mar. 17, 2006

(86) PCT No.: PCT/EP2006/002670

§ 371 (c)(1),
(2), (4) Date: Sep. 18, 2007

(87) PCT Pub. No.: WO2006/097353

PCT Pub. Date: Sep. 21, 2006

(65) Prior Publication Data

US 2008/0214702 A1    Sep. 4, 2008

(30) Foreign Application Priority Data

Mar. 18, 2005 (IT) .............................. MI2005A0452

(51) Int. Cl.
*C08G 63/16* (2006.01)

(52) U.S. Cl. ........ 528/302; 528/271; 528/272; 528/304; 525/418; 525/419; 525/437; 428/35.1; 428/77; 428/480

(58) Field of Classification Search .................. 528/271, 528/272, 437, 302, 300, 303, 304, 305, 306, 528/308, 308.1, 308.3; 428/35.1, 480, 35.2, 428/35.7, 36.4, 77, 221, 357, 409, 411.1; 524/35, 47, 27; 525/418, 419, 437
See application file for complete search history.

(56) References Cited

U.S. PATENT DOCUMENTS

| 3,515,628 A | 6/1970 | Jackson, Jr. et al. |
| 4,131,595 A | 12/1978 | Breitenfellner et al. |
| 4,966,959 A | 10/1990 | Cox et al. |
| 5,661,193 A | 8/1997 | Khemani et al. |
| 6,020,393 A * | 2/2000 | Khemani .................. 521/182 |
| 6,150,490 A * | 11/2000 | Deckwer et al. ............. 528/80 |
| 6,399,716 B2 * | 6/2002 | Chung et al. ............... 525/444 |
| 6,458,858 B1 | 10/2002 | Braun et al. |
| 2002/0115817 A1 * | 8/2002 | Hayes .................... 528/295.3 |

FOREIGN PATENT DOCUMENTS

| EP | 0 950 678 | 10/1999 |
| GB | 1033958 | 6/1966 |
| WO | WO 2006/097354 A1 | 9/2006 |

OTHER PUBLICATIONS

European Patent Office Communication of a Notice of Opposition dated Jan. 10, 2011, in European Patent No. 1858951 and Opposition (Annex 1) and Document 06.
Mattier Toledo, Operating instructions, "Density determination kit for Excellence XP/XS analytical balancers," 2008, pp. 1-15, 72.
Chuah, H.H., et al., "Poly(trimethylene terephthaiate) molecular weight and Mark-Houwink equation," Polymer, vol. 42, 2001, pp. 7137-7139.
Gargallo, Ligia, et al., "Conformational transistion in (maleic anhydride mono-*n*-octyl itaconate copolymer," Polymer Bulletin, vol. 37, 1996, pp. 553-555.
Odian, George, "Step Polymerization," Principles of Polymerization, John Wiley and Sons, Fourth Edition, 2004, pages 39-197.
Acknowledgement of Receipt and Relay under Rule 79(1) EPC dated Aug. 4, 2011, and Experimental Report.

* cited by examiner

*Primary Examiner* — James J Seidleck
*Assistant Examiner* — Frances Tischler
(74) *Attorney, Agent, or Firm* — Connolly Bove Lodge & Hutz LLP

(57) ABSTRACT

Biodegradable aliphatic/aromatic copolyester comprising 50 to 60 mol % of an aromatic dicarboxylic acid and 40 to 50 mol % of an aliphatic acid, at least 90% of which is a long-chain dicarboxylic acid (LCDA) of natural origin selected from azelaic acid, sebacic acid, brassylic acid or mixtures thereof; and a diol component.

15 Claims, No Drawings

BIODEGRADABLE ALIPHATIC-AROMATIC POLYESTERS

RELATED APPLICATIONS

This application is a national stage application (under 35 U.S.C. §371) of PCT/EP2006/002670 filed Mar. 17, 2006, which claims benefit of Italian application MI2005A000452 filed Mar. 18, 2005, disclosure of which are incorporated herein by reference.

The present invention relates to biodegradable aliphatic-aromatic polyesters (AAPE) obtained from long-chain aliphatic dicarboxylic acids, polyfunctional aromatic acids and diols, as well as to mixtures of said polyesters with other biodegradable polymers of natural or synthetic origin.

Biodegradable aliphatic-aromatic polyesters obtained from dicarboxylic acids and diols are known in the literature and are commercially available. The presence of the aromatic component in the polyester chain is important to obtain polymers with sufficiently high melting point and acceptable crystallization rate.

Although polyesters of this type are currently commercially available, the amount of aromatic acid in the chain is typically lower than 49%, since the percentage of biodegradation of the polyesters decreases significantly above said threshold.

It is reported in the literature (Muller et al., Angew. Chem., Int., Ed. (1999), 38, pp. 1438-1441) that copolymers of the polybutylene adipate-co-terephthalate type with a molar fraction of terephthalate of 42 mol %, biodegrade completely to form compost in twelve weeks, whereas products with 51 mol % of molar fraction of terephthalate show a percentage of biodegradation of less than 40%. This different behaviour was attributed to the formation of a higher number of butylene terephthalate sequences with a length greater than or equal to 3, which are less easily biodegradable. If it were possible to maintain suitable biodegradation properties, an increase in the percentage of aromatic acid in the chain would, however, be desirable, in so far as it would bring about an increase in the melting point of the polyester, an increase in, or at least a maintenance of, important mechanical properties, such as ultimate strength and elastic modulus, and would moreover bring about an increase in the crystallization rate of the polyester, thereby improving its industrial processability.

A further drawback of biodegradable aliphatic-aromatic polyesters that are currently commercially available is represented by the fact that the monomers of which they are constituted come from non-renewable sources, thereby maintaining a significant environmental impact associated to the production of such polyesters, despite their biodegradability. They have far more energy content than LDPE and HDPE, particularly in the presence of adipic acid. On the other hand, the use of monomers of vegetal origin would contribute to the reduction of emission of $CO_2$ in the atmosphere, and to the reduction in the use of monomers derived from non-renewable resources.

U.S. Pat. No. 4,966,959 discloses certain copolyesters comprising from 60 to 75% mol of terephtalic acid, 25 to 40% mol of a carboxylic aliphatic or cycloaliphatic acid, and a glycol component. The inherent viscosity of such polyesters is from about 0.4 to about 0.6, rendering the polyesters useful as adhesives but unsuitable for many other applications.

U.S. Pat. No. 4,398,022 discloses copolyesters comprising terephtalic acid and 1,12-dodecanedioic acid and a glycol component comprising 1,4-cyclohexanedimethanol. The acid component may optionally include one or more acids conventionally used in the production of polyesters, but the examples show that 1,12-dodecanedioic acid must be present for the polyesters to have the desired melt strength.

U.S. Pat. No. 5,559,171 discloses binary blends of cellulose esters and aliphatic-aromatic copolyesters. The AAPE component of such blends comprises a moiety derived from a $C_2$-$C_{14}$ aliphatic diacid which can range from 30 to 95% mol in the copolymer, a moiety derived from an aromatic acid which can range from 70 to 5% mol in the copolymer. Certain AAPEs disclosed in this document do not require blending and are useful in film application. They comprise a moiety derived from a $C_2$-$C_{10}$ aliphatic diacid which can range from 95 to 35% mol in the copolymer, and a moiety derived from an aromatic acid which can range from 5 to 65% mol in the copolymer.

DE-A-195 08 737 discloses biodegradable AAPEs comprising terephtalic acid, an aliphatic diacid and a diol component. The weight average molecular weight $M_w$ of such AAPEs is always very low (maximum 51000 g/mol), so that their industrial applicability is limited.

It is therefore the overall object of the present invention to disclose improved AAPEs and blends containing the same.

In fact, the present invention regards a biodegradable aliphatic/aromatic copolyester (AAPE) comprising:
A) an acid component comprising repeating units of:
   1) 50 to 60 mol % of an aromatic polyfunctional acid;
   2) 40 to 50 mol % of an aliphatic acid, at least 90% of which is a long-chain dicarboxylic acid (LCDA) of natural origin selected from azelaic acid, sebacic acid, brassylic acid or mixtures thereof;
B) at least one diol component;
said aliphatic long-chain dicarboxylic acid (LCDA) and said diol component (B) having a number of carbon atoms according to the following formula:

$$(C_{LCDA} \cdot y_{LCDA})/2 + C_B \cdot y_B > 7.5$$

where:
   $C_{LCDA}$ is the number of carbon atoms of the LCDA and can be 9, 10 or 13;
   $y_{LCDA}$ is the molar fraction of each LCDA on the total number of moles of LCDA;
   $C_B$ is the number of carbon atoms of each diol component;
   $y_B$ is the molar fraction of each diol on the total number of moles of the diol component (B)
said AAPE having:
   a biodegradability after 90 days higher than 70%, with respect to pure cellulose according to the Standard ISO 14855 Amendment 1;
   a density equal to or less than 1.2 g/cc;
   a number average molecular weight $M_n$ of from 40,000 to 140,000;
   an inherent viscosity of from 0.8 to 1.5

Preferably, the biodegradability after 90 days as defined above is higher than 80%.

The AAPE according to the invention is rapidly crystallisable. Preferably, the biodegradable polyesters of the invention are characterized in that said aliphatic long-chain dicarboxylic acid (LCDA) and said diol component (B) have a number of carbon atoms according to the following formula:

$$(C_{LCDA} \cdot y_{LCDA}/2) + C_B \cdot y_B > 8$$

By "polyfunctional aromatic acids" for the purposes of the present invention are preferably meant aromatic dicarboxylic compounds of the phthalic-acid type and their esters, preferably terephthalic acid.

The content of aromatic dicarboxylic acid in the biodegradable polyesters according to the present invention is between 50 mol % and 60 mol % with respect to the total molar content of the dicarboxylic acids.

The number average molecular weight $M_n$ of the polyester according to the present invention is comprised between 40 000 and 140 000. The polydispersity index $M_w/M_n$ determined by means of gel-permeation chromatography (GPC) is between 1.7 and 2.6, preferably between 1.8 and 2.5.

Examples of diols according to the present invention are 1,2-ethandiol, 1,2-propandiol, 1,3-propandiol, 1,4-butandiol, 1,5-pentandiol, 1,6-hexandiol, 1,7-heptandiol, 1,8-octandiol, 1,9-nonandiol, 1,10-decandiol, 1,11-undecandiol, 1,12-dodecandiol, 1,13-tridecandiol, 1,4-cyclohexandimethanol, propylene glycol, neo-pentyl glycol, 2-methyl-1,3-propandiol, dianhydrosorbitol, dianhydroman-nitol, dianhydroiditol, cyclohexandiol, and cyclohexan-methandiol. Particularly preferred are diols of the $C_2$-$C_{10}$ type. Even more particularly preferred are the $C_2$-$C_4$ diols. Butandiol is the most preferred one.

The polyesters according to the invention have an inherent viscosity (measured with Ubbelhode viscosimeter for solutions in $CHCl_3$ of a concentration of 0.2 g/dl at 25° C.) of between 0.8 dl/g and 1.5 dl/g, preferably between 0.83 dl/g and 1.3 dl/g and even more preferably between 0.85 dl/g and 1.2 dl/g.

The Melt Flow Rate (MFR) of the polyesters according to the invention, in the case of use for applications typical of plastic materials (such as, for example, bubble filming, injection moulding, foams, etc.), is between 0.5 and 100 g/10 min, preferably between 1.5-70 g/10 min, more preferably between 2.0 and 50 g/10 min (measurement made at 190° C./2.16 kg according to the ASTM D1238 standard).

The polyesters according to the invention have a crystallization temperature $T_c$ higher than 25° C., preferably higher than 30° C. and most preferably higher than 40° C.

The polyesters have a density measured with a Mohr-Westphal weighing machine equal to or less than 1.20 g/cm$^3$.

The aliphatic acid A2 which can be different from LCDA can comprise or consist of at least one hydroxy acid in an amount of up to 10 mol % with respect to the total molar content of the aliphatic acid. Examples of suitable hydroxy acids are glycolic acid, hydroxybutyric acid, hydroxycaproic acid, hydroxyvaleric acid, 7-hydroxyheptanoic acid, 8-hydroxycaproic acid, 9-hydroxynonanoic acid, lactic acid or lactide. The hydroxy acids can be inserted in the chain as such, or else can also be previously made to react with diacids or dialcohols. The hydroxy acid units can be inserted randomly in the chain or can form blocks of adjacent units.

In the process of preparation of the copolyester according to the invention one or more polyfunctional molecules, in amounts of between 0.02-3.0 mol %, preferably between 0.1 mol % and 2.5 mol % with respect to the amount of dicarboxylic acids (as well as to the possible hydroxy acids), can advantageously be added in order to obtain branched products. Examples of these molecules are glycerol, pentaerythritol, trimethylol propane, citric acid, dipentaerythritol, monoanhydrosorbitol, monohydro-mannitol, epoxidized oils such as epoxidized soybean oil, epoxidized linseed oil and so on, dihydroxystearic acid, itaconic acid and so on.

Although the polymers according to the present invention reach high levels of performance without any need to add chain extenders such as di and/or poly isocyanates and isocyanurates, di and/or poly epoxides, bis-oxazolines, poly carbodiimides or divinylethers, it is in any case possible to modify the properties thereof as the case may require.

Generally such additives are used in percentages comprised between 0.05-2.5%, preferably 0.1-2.0%. In order to improve the reactivity of such additives, specific catalysts can be used such as for example zinc stearates (metal salts of fatty acids) for poly epoxides.

The increase in the molecular weight of the polyesters can advantageously be obtained, for example, by addition of various organic peroxides during the process of extrusion. The increase in molecular weight of the biodegradable polyesters can be easily detected by observing the increase in the values of viscosity following upon treatment of the polyesters with peroxides.

In case of use of the polyesters according to the present invention for the production of films, the addition of the above mentioned chain extenders according to the teaching of EP 1 497 370 results in a production of a gel fraction lower than 4.5% w/w with respect to the polyester. In this connection the content of EP 1 497 370 has to be intended as incorporated by reference in the present description. The polyesters according to the invention possess properties and values of viscosity that render them suitable for use, by appropriately adjusting the molecular weight, in numerous practical applications, such as films, injection-moulded products, extrusion-coating products, fibres, foams, thermoformed products, extruded profiles and sheets, extrusion blow molding, injection blow molding, rotomolding, stretch blow molding etc.

In case of films, production technologies like film blowing, casting, and coextrusion can be used. Moreover such films can be subject to biorientation in line or after film production. The films can be also oriented through stretching in one direction with a stretching ratio from 1:2 up to 1:15, more preferably from 1:2, 2 up to 1:8. It is also possible that the stretching is obtained in presence of an highly filled material with inorganic fillers. In such a case, the stretching can generate microholes and the so obtained film can be particularly suitable for hygiene applications. In particular, the polyesters according to the invention are suitable for the production of:

films, whether one-directional or two-directional, and multilayer films with other polymeric materials;

films for use in the agricultural sector as mulching films;

cling films (extensible films) for foodstuffs, for bales in the agricultural sector and for wrapping of refuse;

shrink film such as for example for pallets, mineral water, six pack rings, and so on;

bags and liners for collection of organic matter, such as collection of refuse from foodstuffs, and for gathering mowed grass and yard waste;

thermoformed single-layer and multilayer packaging for foodstuffs, such as for example containers for milk, yoghurt, meat, beverages, etc.;

coatings obtained with the extrusion-coating technique;

multilayer laminates with layers of paper, plastic materials, aluminium, metallized films;

foamed or foamable beads for the production of pieces formed by sintering;

foamed and semi-foamed products including foamed blocks made up of pre-foamed particles;

foamed sheets, thermoformed foamed sheets, containers obtained therefrom for the packaging of foodstuffs;

containers in general for fruit and vegetables;

composites with gelatinized, destructured and/or complexed starch, natural starch, flours, other fillers of natural, vegetal or inorganic origin;

fibres, microfibres, composite fibres with a core constituted by rigid polymers, such as PLA, PET, PTT, etc. and an external shell made with the material according to the invention, composite fibres, fibres with various sections (from round to multilobed), flaked fibres, fabrics and non-woven fabrics or spun-bonded or thermobonded fabrics for the sanitary sector, the hygiene sector, the agricultural sector, georemediation, landscaping and the clothing sector.

The polyesters according to the invention can moreover be used in blends, obtained also by reactive extrusion, whether with polyesters of the same type (such as aliphatic/aromatic copolyester as for example polybutylene tereptalate adipate PBTA, polybutylene tereftalatesuccinate PBTS, and polybutylene tereftalateglutarate PBTG) or with other biodegradable polyesters (for example, polylactic acid, poly-ε-caprolactone, polyhydroxybutyrates such as poly-3-hydroxybutyrates, poly-4-hydroxybutyrates and polyhydroxy-butyrate-valerate, polyhydroxybutyrate-propano-ate, polyhydroxybutyrate-hexanoate, polyhydroxybutyrate-decanoate, polyhydroxybutyrate-dodecanoate, polyhydroxy-butyrate-hexadecanoate, polyhydroxybutyrate-octadecanoate, and polyalkylene succinates and their copolymers with adipic acid, lactic acid or lactide and caprolacton and their combinations), or other polymers different from polyesters.

Mixtures of polyesters with polylactic acid are particularly preferred.

According to another object of the invention, the polyesters according to the invention can also be used in blends with polymers of natural origin, such as for example starch, cellulose, chitosan, alginates, natural rubbers or natural fibers (such as for example jute, kenaf, hemp). The starches and celluloses can be modified, and amongst these starch or cellulose esters with a degree of substitution of between 0.2 and 2.5, hydroxypropylated starches, and modified starches with fatty chains may, for example, be mentioned. Preferred esters are acetates, propionates, butirrates and their combinations. Starch can moreover be used both in its destructurized form and in its gelatinized form or as filler.

Mixtures of polyesters with starch are particularly preferred. Mixtures of polyesters according to the present invention with starch can form biodegradable polymeric compositions with good resistance to ageing and to humidity. In these compositions, which comprise thermoplastic starch and a thermoplastic polymer incompatible with starch, starch constitutes the dispersed phase and the thermoplastic polymer constitutes the continuous phase. In this connection the content of EP 947 559 has to be intended as incorporated by reference in the present description.

The polymeric compositions can maintain a high tear strength even in conditions of low humidity. Such characteristic is obtained when starch is in the form of a dispersed phase with an average dimension lower than 1 μm. The preferred average numeral size of the starch particles is between 0.1 and 0.5 microns and more than 80% of the particles have a size of less than 1 micron.

Such characteristics can be achieved when the water content of the composition during mixing of the components is preferably kept between 1 and 15%. It is, however, also possible to operate with a content of less than 1% by weight, in this case, starting with predried and pre-plasticized starch.

It could be useful also to degrade starch at a low molecular weight before or during compounding with the polyesters of the present invention in order to have in the final material or finished product a starch inherent viscosity between 1 and 0.2 dl/g, preferably between 0.6 and 0.25 dl/g, more preferably between 0.55 and 0.3 dl/g.

Destructurized starch can be obtained before of during mixing with the polyesters of the present invention in presence of plasticizers such as water, glycerol, di and polyglycerols, ethylene or propylene glycol, ethylene and propylene diglycol, polyethylene glycol, polypropylenglycol, 1,2 propandiol, trymethylol ethane, trimethylol propane, pentaerytritol, dipentaerytritol, sorbitol, erytritol, xylitol, mannitol, sucrose, 1,3 propandiol, 1,2,1,3,1,4 buthandiol, 1,5 pentandiol, 1,6,1,5 hexandiol, 1,2,6,1,3,5-hexantriol, neopenthil glycol, and polyvinyl alcohol prepolymers and polymers, polyols acetates, ethoxylates and propoxylates, particularly sorbitol ethoxylate, sorbitol acetate, and pentaerytritol acetate. The quantity of high boiling point plasticizers (plasticizers different from water) used are generally from 0 to 50%, preferably from 10 to 30% by weight, relative to starch.

Water can be used as a plasticizer in combination with high boiling point plasticizers or alone during the plastification phase of starch before or during the mixing of the composition and can be removed at the needed level by degassing in one or more steps during extrusion. Upon completion of the plastification and mixing of the components, the water is removed by degassing to give a final content of about 0.2-3% by weight.

Water, as well as high-boiling point plasticizers, modifies the viscosity of the starch phase and affects the rheological properties of the starch/polymer system, helping to determine the dimensions of the dispersed particles. Compatibilizers can be also added to the mixture. They can belong to the following classes:

Additives such as esters which have hydrophilic/lipophilic balance index values (HLB) greater than 8 and which are obtained from polyols and from mono or polycarboxylic acids with dissociation constants pK lower than 4.5 (the value relates to pK of the first carboxyl group in the case of polycarboxylic acids.)

Esters with HLB values of between 5.5 and 8, obtained from polyols and from mono or polycarboxylic acids with less than 12 carbon atoms and with pK values greater than 4.5 (this value relates to the pK of the first carboxylic group in the case of polycarboxylic acids).

Esters with HLB values lower than 5.5 obtained from polyols and from fatty acids with 12-22 carbon atoms.

These compatibilizers can be used in quantities of from 0.2 to 40% weight and preferably from 1 to 20% by weight related to the starch. The starch blends can also contain polymeric compatibilizing agents having two components: one compatible or soluble with starch and a second one soluble or compatible with the polyester.

Examples are starch/polyester copolymers through transesterification catalysts. Such polymers can be generated trough reactive blending during compounding or can be produced in a separate process and then added during extrusion. In general block copolymers of an hydrophilic and an hydrophobic units are particularly suitable. Additives such as di and polyepoxides, di and poly isocyanates, isocyanurates, polycarbodiimmides and peroxides can also be added. They can work as stabilizers as well as chain extenders.

All the products above can help to create the needed microstructure. It is also possible to promote in situ reactions to create bonds between starch and the polymeric matrix. Also aliphatic-aromatic polymers chain extended with aliphatic or aromatic diisocyanates or di and polyepoxides or isocyanurates or with oxazolines with intrinsic viscosities higher than 1 dl/9 or in any case aliphatic-aromatic polyesters with a ratio between Mn and MFI at 190° C., 2.16 kg higher than 10 000, preferably higher than 12 500 and more preferably higher than 15 000 can also be used to achieve the needed microstructure.

Another method to improve the microstructure is to achieve starch complexation in the starch-polyester mixture.

In this connection the content of EP 965 615 has to be intended as incorporated by reference in the present description. In such a case, in the X-Ray spectra of the compositions with the polyester according to the present invention, the Hc/Ha ratio between the height of the peak (Hc) in the range of 13-14° of the complex and the height of the peak (Ha) of the amorphous starch which appears at about 20.5° (the profile of the peak in the amorphous phase having been reconstructed) is less than 2 and greater than 0.02.

The starch/polyester ratio is comprised in the range 5/95% weight up to 60/40% by weight, more preferably 10/90-45/55% by weight. In such starch-based blends in combination with the polyesters of the present invention it is possible to add polyolefins, polyvynil alcohol at high and low hydrolysis degree, ethylene vinylalcohol and ethylene vinylacetate copolymers and their combinations as well as aliphatic polyesters such as polybuthylensuccinate, polybuthylensuccinate adipate, polybuthylensuccinate adipate-caprolactate, polybuthylensuccinate-lactate, polycaprolactone polymers and copolymers, PBT, PET, PTT, polyamides, polybuthylen terephtalate adipates with a content of terephtalic acid between 40 and 70% with and without solfonated groups with or without branchs and possibly chain extended with diisocianates or isocianurates, polyurethanes, polyamide-urethanes, cellulose and starch esters such as acetate, propionate and butyrrate with substitution degrees between 1 and 3 and preferably between 1.5 and 2.5, polyhydroxyalkanoates, poly L-lactic acid, poly-D lactic acid and lactides, their mixtures and copolymers.

The starch blends of the polyesters of the present invention maintain a better ability to crystallize in comparison with compostable starch blends where copolyester are polybuthylen adipate terephtalates at terephtalic content between 45 and 49% (range of the product with industrial performances) and can be easily processable in film blowing even at MFI (170° C., 5 kg) of 7 g/10 min due to the high crystallization rate of the matrix. Moreover they have impact strength higher than 20 kj/m2, preferably higher than 30 kj/m2 and most preferably higher than 45 kj/m2 (measured on blown film 30 um thick at 10° C. and less then 5% relative humidity). Particularly resistant and easily processable compounds contain destructurized starch in combination with the polyesters of the invention and polylactic acid polymers and copolymers with and without additives such as polyepoxides, carbodiimmides and/or peroxides.

The starch-base films can be even transparent in case of nanoparticles of starch with dimensions lower than 500 μm and preferably lower than 300 μm.

It is also possible to go from a dispersion of starch in form of droplets to a dispersion in which two co-continuous phases coexist and the blend is characterized for allowing a higher water content during processing.

In general, to obtain co-continuous structures it is possible to work either on the selection of starch with high amylopectine content and/or to add to the starch-polyester compositions block copolymers with hydrophobic and hydrophilic units. Possible examples are polyvynilacetate/polyvinylalcohol and polyester/polyether copolymers in which the block length, the balance between the hydrophilicity and hydrophobicity of the blocks and the quality of compatibilizer used can be suitably changed in order to finely adjust the microstructure of the starch-polyester compositions.

The polyesters according to the invention can also be used in blends with the polymers of synthetic origin and polymers of natural origin mentioned above. Mixtures of polyesters with starch and polylactic acid are particularly preferred.

Blends of the polyesters according the present invention with PLA are of particular interest because the high crystallization rate of the aliphatic-aromatic polyesters of the invention and their high compatibility with PLA polymers and copolymers permits to cover materials with a wide range of rigidities and high speed of crystallization which makes these blends particularly suitable for injection molding and extrusion.

Moreover, blends of such polyesters with poly L-lactic acid and poly D-lactic acid or poly L-lactide and D-lactide where the ratio between poly L- and poly D-lactic acid or lactide is in the range 10/90-90/10, preferably 20/80-80/20, and the ratio between aliphatic-aromatic polyester and the polylactic acid or PLA blend is in the range 5/95-95/5, preferably 10/90-90/10, are of particular interest for the high crystallization speed and the high thermal resistance. Polylactic acid or lactide polymers or copolymers are generally of molecular weight Mn in the range between 30 000 and 300 000, more preferably between 50 000 and 250 000.

To improve the transparency and thoughness of such blends and decrease or avoid a lamellar structure of polylactide polymers, it is possible to introduce other polymers as compatibilizers or toughening agents such as: polybuthylene succinate and copolymers with adipic acid and or lactic acid and or hydroxyl caproic acid, polycaprolactone, aliphatic polymers of diols from C2 to C13 and diacids from C4 to C13, polyhydroxyalkanoates, polyvynilalcohol in the range of hydrolysis degree between 75 and 99% and its copolymers, polyvynilacetate in a range of hydrolysis degree between 0 and 70%, preferably between 0 and 60%. Particularly preferred as diols are ethylene glycol, propandiol, butandiol and as acids: azelaic, sebacic, undecandioic acid, dodecandioic acid, brassylic acid and their combinations.

To maximize compatibility among the polyesters of the invention and polylactic acid it is very useful the introduction of copolymers with blocks having high affinity for the aliphatic-aromatic copolyesters of the invention, and blocks with affinity for the lactic acid polymers or copolymers. Particularly preferred examples are block copolymers of the aliphatic aromatic copolymers of the invention with polylactic acid. Such block copolymers can be obtained taking the two original polymers terminated with hydroxyl groups and then reacting such polymers with chain extenders able to react with hydroxyl groups such as diisocyanates. Examples are 1.6 esamethylendiisocyanate, isophorondiisocyanate, methylendiphenildiisocyanate, toluendiisocyanate or the like. It is also possible to use chain extenders able to react with acid groups like di and poly epoxides (e.g. bisphenols diglycidyl ethers, glycerol diglycidyl ethers) divinyl derivatives if the polymers of the blend are terminated with acid groups. It is possible also to use as chain extenders carbodiimmides, bisoxazolines, isocyanurates etc.

The intrinsic viscosity of such block copolymers can be between 0.3 and 1.5 dl/g, more preferably between 0.45 and 1.2 dl/g. The amount of compatibilizer in the blend of aliphatic-aromatic copolyesters and polylactic acid can be in the range between 0.5 and 50%, more preferably between 1 and 30%, more preferably between 2 and 20% by weight.

The polyesters according to the present invention can advantageously be blended also with filler both of organic and inorganic nature. The preferred amount of fillers is in the range of 0.5-70% by weight, preferably 5-50% by weight.

As regards organic fillers, wood powder, proteins, cellulose powder, grape residue, bran, maize husks, compost, other natural fibres, cereal grits with and without plasticizers such as polyols can be mentioned.

As regards inorganic fillers, it can be mentioned substances that are able to be dispersed and/or to be reduced in lamellas with submicronic dimensions, preferably less than 500 nm, more preferably less than 300 nm, and even more preferably less than 50 nm. Particularly preferred are zeolites and silicates of various kind such as wollastonites, montmorillonites, hydrotalcites also functionalised with molecules able to interact with starch and or the specific polyester. The use of such fillers can improve stiffness, water and gas permeability, dimensional stability and maintain transparency.

The process of production of the polyesters according to the present invention can be carried out according to any of the processes known to the state of the art. In particular the polyesters can be advantageously obtained with a polycondensation reaction.

Advantageously, the process of polymerization of the copolyester can be conducted in the presence of a suitable catalyst. As suitable catalysts, there may be mentioned, by way of example, metallo-organic compounds of tin, for example derivatives of stannoic acid, titanium compounds, for example orthobutyl titanate, and aluminium compounds, for example triisopropyl aluminium, antimony compounds, and zinc compounds.

EXAMPLES

In the examples provided hereinafter, the following test methods were adopted:
MFR was measured in the conditions envisaged by the ASTM D 1238-89 standard at 150° C. and 5 kg or at 190° C. and 2.16 kg;
the melting and crystallization temperatures and enthalpies were measured with a differential scanning calorimeter Perkin Elmer DSC7, operating with the following thermo profile:
1st scan from −30° C. to 200° C. at 20° C./min
2nd scan from 200° C. to −30° C. at 10° C./min
3rd scan from −30° C. to 200° C. at 20° C./min
$T_{m1}$ was measured as endothermic-peak value of the 1st scan, and $T_{m2}$ as that of the 3rd scan; $T_c$ was measured as exothermic-peak value of the 2nd scan.
Density
Determination of Density according to the Mohr Westphal method was performed with an analytical balance Sartorius AC 120S equipped with a Sartorius Kit YDK 01. The Kit was provided with two small baskets. Once the Kit had been mounted, ethanol was introduced in the crystallizer. The balance was maintained at room temperature.
Each test was performed with about 2 g of polymer (one or more pellets).
The density d was determined according to the formula below:

$$D=(W_a/G)d_{fl}$$

where
$W_a$: weight of the sample in air
$W_{fl}$: weight of the sample in alcohol
$G=W_a-W_{fl}$
$d_{fl}$=ethanol density at room temperature (Values read on tables provided by the company Sartorius with the Kit).
The experimental error of the Density values was in the range of $\pm 2.5 \times 10^{-3}$.
$\eta_{in}$ has been determined according to the ASTM 2857-87 method
$M_n$ has been determined on a Agilent 1100 Series GPC system, with chloroform as eluent and polystyrene standards for the calibration curve".

Example 1

A 25-1 steel reactor, provided with a mechanical stirrer, an inlet for the nitrogen flow, a condenser, and a connection to a vacuum pump was charged with:

2890 g of terephthalic acid (17.4 mol),
3000 g of sebacic acid (14.8 mol),
3500 g butandiol (38.9 mol),
6.1 g of butylstannoic acid.
The molar percentage of terephthalic acid with respect to the sum of the moles of the acid components was 54.0 mol %.
The temperature of the reactor was then increased up to 200° C., and a nitrogen flow was applied. After approximately 90% of the theoretical amount of water had been distilled, the pressure was gradually reduced to a value of less than 3 mmHg, and the temperature was raised to 240° C.
After approximately 3 hours, the molten product was poured from the reactor, cooled in a water bath and granulated. During the latter operations it was possible to note how the product starts to solidify rapidly and can be easily granulated. The product obtained had an inherent viscosity (measured in chloroform at 25° C., c=0.2 g/dl) $\eta_{in}$=0.93 (dl/g), MFR (190° C., 2.16 kg)=20 g/10 min, $M_n$=52103 and a density of 1.18 g/cm³.
From H-NMR analysis a percentage of aromatic units was found of 53.5±0.5%.

Example 1A

The reactor as per Example 1 was charged with the same ingredients of Example 1:
2890 g of terephthalic acid (17.4 mol),
3000 g of sebacic acid (14.8 mol),
3500 g butandiol (38.9 mol),
6.1 g of butylstannoic acid.
The molar percentage of terephthalic acid with respect to the sum of the moles of the acid components was 54.0 mol %.
The reaction has been carried out for the time necessary to obtain a product having an inherent viscosity (measured in chloroform at 25° C., c=0.2 g/dl) $\eta_{in}$=1.03 (dl/g), MFR (190° C., 2.16 kg)=14.8 g/10 min, $M_n$=58097 and a density of 1.18 g/cm³.

Example 2

Comparison

The reactor as per Example 1 was charged with:
2480 g of terephthalic acid (14.9 mol),
3400 g of sebacic acid (16.8 mol),
3430 g butandiol (38.1 mol),
6.1 g of butylstannoic acid.
The molar percentage of terephthalic acid with respect to the sum of the moles of the acid components was 47 mol %.
The temperature of the reactor was then raised to 200° C., and a nitrogen flow was applied. After approximately 90% of the theoretical amount of water had been distilled, the pressure was reduced gradually until a value of less than 3 mmHg was reached, and the temperature was raised up to 240° C.
After approximately 3 hours, a product was obtained with inherent viscosity (measured in chloroform at 25° C., c=0.2 g/dl) $\eta_{in}$=1.00 (dl/g) and MFR (190° C., 2.16 kg)=13 g/10 min.
From H-NMR analysis, a percentage of aromatic units of 47.0±0.5% was found.

Example 3

Comparison

The reactor as per Example 1 was charged with:
2770 g of dimethyl terephthalate (14.3 mol), 3030 g of dimethyl adipate (17.4 mol),
3710 g of butandiol (41.2 mol),
0.7 g of tetraisopropyl orthotitanate (dissolved in n-butanol)

The molar percentage of aromatic content with respect to the sum of the moles of the acid components was 45 mol %.

The temperature of the reactor was then increased to 200-210° C. After at least 95% of the theoretical amount of methanol had been distilled, the pressure was gradually reduced until a value of less than 2 mmHg was reached, and the temperature was raised to 250-260° C.

After approximately 4 hours, a product was obtained with inherent viscosity (measured in chloroform at 25° C., c=0.2 g/dl) $\eta_{in}$=0.92 (dl/g) and MFR (190° C., 2.16 kg)=20 g/10 min.

From H-NMR analysis, a percentage of aromatic units of 47.0±0.5% was found.

Example 4

Comparison

The process of Example 1 was repeated with:
3623.9 g of dimethyl terephthalate (18.68 mol),
3582.5 g of butandiol (39.81 mol),
2244.7 g of azelaic acid (11.94 mol).

The molar percentage of aromatic content with respect to the sum of the moles of the acid components was 61 mol %.

A product was obtained with inherent viscosity (measured in chloroform at 25° C., c=0.2 g/dl) $\eta_{in}$=0.95 (dl/g), density 1.21 g/cc and MFR (190° C., 2.16 kg)=5.5 g/10 min.

Example 5

The process of Example 1 was repeated with:
3476.48 g of dimethyl terephthalate (17.92 mol),
3493.80 g of butandiol (38.82 mol),
2411 g of sebacic acid (11.94 mol).

The molar percentage of aromatic content with respect to the sum of the moles of the acid components was 60 mol %.

A product was obtained with $M_n$=56613, $M_w/M_n$=2.0364 inherent viscosity (measured in chloroform at 25° C., c=0.2 g/dl) $\eta_{in}$=0.97 (dl/g), density 120 g/cc and MFR (190° C., 2.16 kg)=7.8 g/10 min.

Example 6

The process of Example 1 was repeated with:
3187.4 g of dimethyl terephthalate (16.43 mol),
3559.1 g of butandiol (39.55 mol),
2630.1 g of azelaic acid (14.00 mol).

The molar percentage of aromatic content with respect to the sum of the moles of the acid components was 54 mol %.

A product was obtained with inherent viscosity (measured in chloroform at 25° C., c=0.2 g/dl) $\eta_{in}$=1.04 (dl/g), density=1.2 g/cc and MFR (190° C., 2.16 kg)=7.12 g/10 min.

Example 7

The process of Example 1 was repeated with:
2865.4 g of dimethyl terephthalate (14.77 mol),
3201.1 g of butandiol (35.57 mol),
3072 g of brassylic acid (12.6 mol).

The molar percentage of aromatic content with respect to the sum of the moles of the acid components was 54 mol %.

A product was obtained with inherent viscosity (measured in chloroform at 25° C., c=0.2 g/dl) $\eta_{in}$=0.90 (dl/g), density=1.16 g/cc and MFR (190° C., 2.16 kg)=g/10 min.

The specimens of the above examples were then filmed with the blow-film technique, on a Formac Polyfilm 20 apparatus, equipped with metering screw 20C13, L/D=25, RC=1.3; air gap 1 mm; 30-50 RPM; T=140-180° C. The films thus obtained had a thickness of approximately 30 μm.

A week after filming, and after conditioning at 23(?)° C., with 55% relative humidity, the tensile properties were measured according to the ASTM D882-88 standards.

Listed in Table 1 are the thermal properties of the products of the examples, whilst Table 2 lists the mechanical properties of the films obtained from such products.

TABLE 1

Thermal properties

| Example | Aromatic | $T_{m1}$ | $\Delta H_{m1}$ | $T_c$ | $\Delta H_c$ | $T_{m2}$ |
|---|---|---|---|---|---|---|
| 1 | 53.5% | 133 | 28 | 58 | 20 | 130 |
| 1A | 53.5 | — | — | 46 | 19 | 129 |
| 2 (comp.) | 47% | 112 | 19 | 22 | 19 | 113 |
| 3 (comp.) | 47% | 120 | 19 | 16 | 18 | 114 |
| 4 (comp) | 61% | — | — | 104 | 21 | 154 |
| 5 | 60% | — | — | 82 | 23 | 145 |
| 6 | 54% | — | — | 42 | 24 | 130 |
| 7 | 54% | — | — | 76 | 16 | 133 |

TABLE 2

Mechanical properties

| Tensile properties - longitudinal | EXAMPLE | | | | | | |
|---|---|---|---|---|---|---|---|
| | 1 | 2 (comp) | 3 (comp) | 4 (comp) | 5 | 6 | 7* |
| Yield point (MPa) | 11 | 6.5 | 9 | 11.5 | 12 | 9 | 6 |
| Ultimate strength (MPa) | 40 | 28 | 40 | 40.0 | 45 | 33.5 | 23.5 |
| Elastic modulus (MPa) | 90 | 65 | 105 | 170 | 130 | 120 | 70 |
| Failure energy (MJ/m$^3$) | 143 | 135 | 170 | 150 | 154 | 169 | 155 |

*The mechanical properties of the product of example 7 were tested on a compression molded sample with a thickness of about 100 μm.

Biodegradation Test

For the products of Table 3 the biodegradation test was carried out in controlled composting according to the Standard ISO 14855 Amendment 1.

The tests were carried out on 30-micron films ground in liquid nitrogen until they were fragmented to a size of less than 2 mm, or on pellets ground to particles having diameter <250 μm. As positive control microcrystalline cellulose Avicel® for column chromatography No. K29865731 202 was used. Powder grain size: 80% between 20 μm 160 μm; 20% less than 20 μm.

TABLE 3

BIODEGRADATION

| Example | Aromatic content | LCDA/Diol | Particles ground from | Relative biodegradation after 90 days |
|---|---|---|---|---|
| 1 | 53.5% | Sebacic Butandiol | Film | 107.44 |
| 2 (comp.) | 47% | Sebacic Butandiol | Film | 99.6 |
| 3 (comp.) | 47% | Adipic Butandiol | Film | 80.71 |
| Cellulose | — | — | Film/pellets | 100 |
| 4 (comp.) | 61% | Azelaic Butandiol | pellets | 10.39 (end of the test: 49 days) |
| 5 | 60% | Sebacic Butandiol | pellets | 104 |
| 6 | 54% | Azelaic Butandiol | pellets | 82 |
| 7 | 54% | Brassilic Butandiol | pellets | 73 |

TABLE 4

DENSITY

| Example | Aromatic content | LCDA/Diol | Density g/cc |
|---|---|---|---|
| 1 | 53.5% | Sebacic/Butandiol | 1.18 |
| 2 (comp.) | 47 | Sebacic/Butandiol | 1.17 |
| 3 (comp.) | 47% | Adipic/Butandiol | 1.23 |
| 4 (comp.) | 61% | Azelaic/Butandiol | 1.21 |
| 5 | 60% | Sebacic/Butandiol | 1.20 |
| 6 | 54% | Azelaic/Butandiol | 1.20 |
| 7 | 54% | Brassylic/Butandiol | 1.15 |

It appears from the examples above that the selection of AAPEs according to the present invention provides products having an excellent balance of biodegradability and mechanical properties.

Example 8

28 parts by weight of the polymer of example 6 were blended with 58 parts of poly L-lactide polymer having a Mn of 180000, MFR at 190° C., 2.16 kg of 3.5 g/10 min, a residue of lactide less than 0.2% and a D content of about 6%, and 14 parts of talc. The extruder used was a twin screw extruder Haake Rheocord 90 Rheomex TW-100. The thermal profile was ranging between 120 and 190° C.

The pellets obtained have been dried for 1 hour at 60 C. The melt viscosity was of 600 Pa*s, measured at 190° C. and shear rate of 100 sec-1 in a capillary rheometer Goettfert Rheotester 1000 equipped with a capillary rheometer of 1 mm. The pellets have been injection molded in a Sandretto Press 60 Series 7 using a dumbbell mold for the production of samples for mechanical testing and a 12 cavity clipper mold to test the industrial moldability.

The mechanical properties obtained on dumbbell samples according to the ASTM norm D638, after conditioning at 23° C., 55% RH are reported below:
Stress at break (MPa) 42
Elongation at break (%) 271
Young Modulus (MPa) 2103
Energy at break (Kj/m2) 1642

The dumbbell samples have been tested in biodegradation under controlled composting obtaining 100% of biodegradation in 50 days. The processing cycles are comparable to polypropylene and are of 14 seconds and the molding system is perfectly automatic.

A blend different from the one described in this example just for the aromatic-aliphatic polyester, particularly the polymer of example 6 is replaced with poly buthylen adipate terephtalate MFR 3.4 at 190° C., 2.16 kg, terephtalic acid 47% mole and density of 1.23 g/cm3 the molded parts could not be demolded automatically.

Example 9

A blend has been made mixing 70% by weight of the polymer of example 5 and 30% by weight of the same PLA described in example 8. The blend has been produced in the twin screw extruder of example 8 with the same thermal profile. The pellets have been dried and have been film blown as reported in the previous examples.

The film has shown the following tensile performances in the film direction:
Stress at break (MPa) 25
Elongation at break (%) 400
Young Modulus (MPa) 590
Energy at break (Kj/m2) 3600

The film had a good transparency. The tear strength was different in the two directions of film blowing showing a significant orientation.

The addition of 10% of a block copolymer of PLA and an aliphatic aromatic block constituted by butandiol with sebacic and terephtalic acid in a ratio 46-54% by mole, having 0.85 dl/g of viscosity gave tensile properties similar and better than the sample without compatibilizer (Stress at break (MPa) 28, Elongation at break (%) 380, Young Modulus (MPa) 840, Energy at break (Kj/m2) 3600) but the tear strength was more balanced in the two directions.

The invention claimed is:

1. Biodegradable aliphatic/aromatic copolyester (AAPE) comprising:
   A) an acid component comprising repeating units of:
      1) 50 to 60 mol % of an aromatic polyfunctional acid;
      2) 40 to 50 mol % of an aliphatic acid, at least 90% of which is a long-chain dicarboxylic acid (LCDA) of natural origin selected from azelaic acid, sebacic acid, brassylic acid or mixtures thereof;
   B) at least one diol component; said aliphatic long-chain dicarboxylic acid (LCDA) and said diol component (B) having a number of carbon atoms according to the following formula: $(C_{LCDA} \cdot Y_{LCDA})/2 + C_B \cdot Y_B > 7.5$ where:
   $C_{LCDA}$ is the number of carbon atoms of the LCDA and can be 9, 10 or 13;
   $Y_{LCDA}$ is the molar fraction of each LCDA on the total number of moles of LCDA;
   $C_B$ is the number of carbon atoms of each diol component;
   $Y_B$ is the molar fraction of each diol on the total number of moles of the diol component (B) said AAPE having: a biodegradability after 90 days higher than 70%, with respect to pure cellulose according to the Standard ISO 14855Amendment 1,
   a density of equal to or less than 1.2 g/cc;
   a number average molecular weight of 40,000-140,000;
   an inherent viscosity of 0.8-1.5.

2. Biodegradable polyester according to claim 1, wherein said aromatic dicarboxylic acid is selected from the group consisting of the phthalic acids.

3. Biodegradable polyester according to claim 2, wherein said aromatic dicarboxylic acid is terephthalic acid.

4. Biodegradable polyester according to claim 1, wherein the polydispersity index $M_w/M_n$, is between 1.7 and 2.6.

5. Biodegradable polyester according to claim 4, wherein said polydispersity index $M_w/M_n$ is between 1.8 and 2.5.

6. Biodegradable polyester according to claim 1, wherein said diol is selected from the group consisting of: 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohexanedimethanol, propylene glycol, neo-pentyl glycol, 2-methyl-1,3-propanediol, dianhydrosorbitol, dianhydromannitol, dianhydroiditol, cyclohexanediol, and cyclohexanemethanediol.

7. Biodegradable polyester according to claim 1, wherein said diol has from 2 to 10 carbon atoms.

8. Biodegradable polyester according to claim 7, wherein said diol has from 2 to 4 carbon atoms.

9. Biodegradable polyester according to claim 1, characterized in that said aliphatic long-chain dicarboxylic acid (LCDA) and said diol component (B) have a number of carbon atoms according to the following formula:

$$(C_{LCDA} \cdot Y_{LCDA})/2 + C_B \cdot Y_B > 8.$$

10. Biodegradable polyester according to claim 1, wherein said biodegradability after 90 days is higher than 80%.

11. Biodegradable polyester according to claim 1, having a crystallization temperature $T_c$ higher than 25° C.

12. Biodegradable polyester according to claim 11, having a crystallization temperature $T_c$ higher than 30° C.

13. Biodegradable polyester according to claim 12, having a crystallization temperature $T_c$ higher than 40° C.

14. Biodegradable polyester according to claim 1, wherein said aliphatic acid comprises at least one hydroxy acid in an amount of up to 10 mol % with respect to the total molar content of the aliphatic acid.

15. A film comprising the polyesters according to claim 1.

* * * * *